Figure 1:
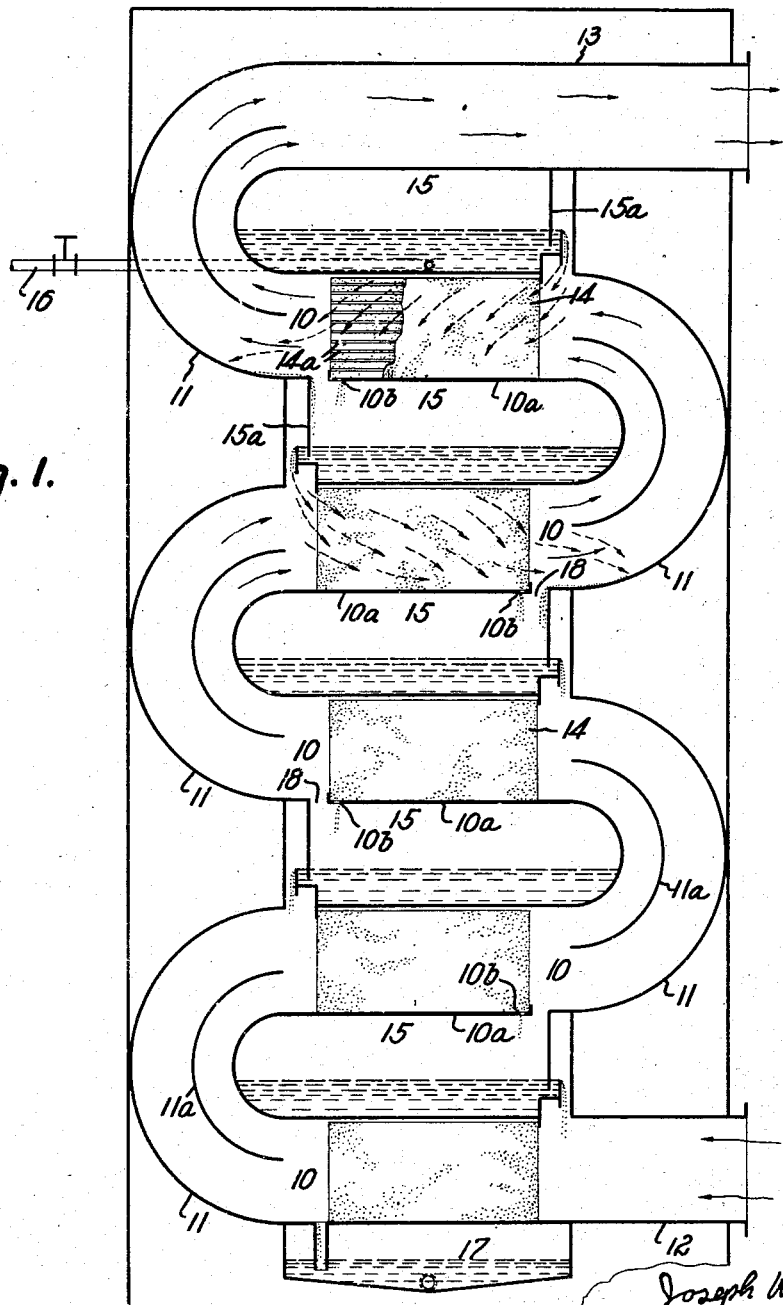

Dec. 22, 1942.   J. W. SPISELMAN ET AL   2,306,192
COOLING TOWER
Filed Dec. 3, 1940   2 Sheets-Sheet 1

Inventors:
Joseph W. Spiselman
Francis K. Green
By Potter, Pierce & Scheffler
Attorneys.

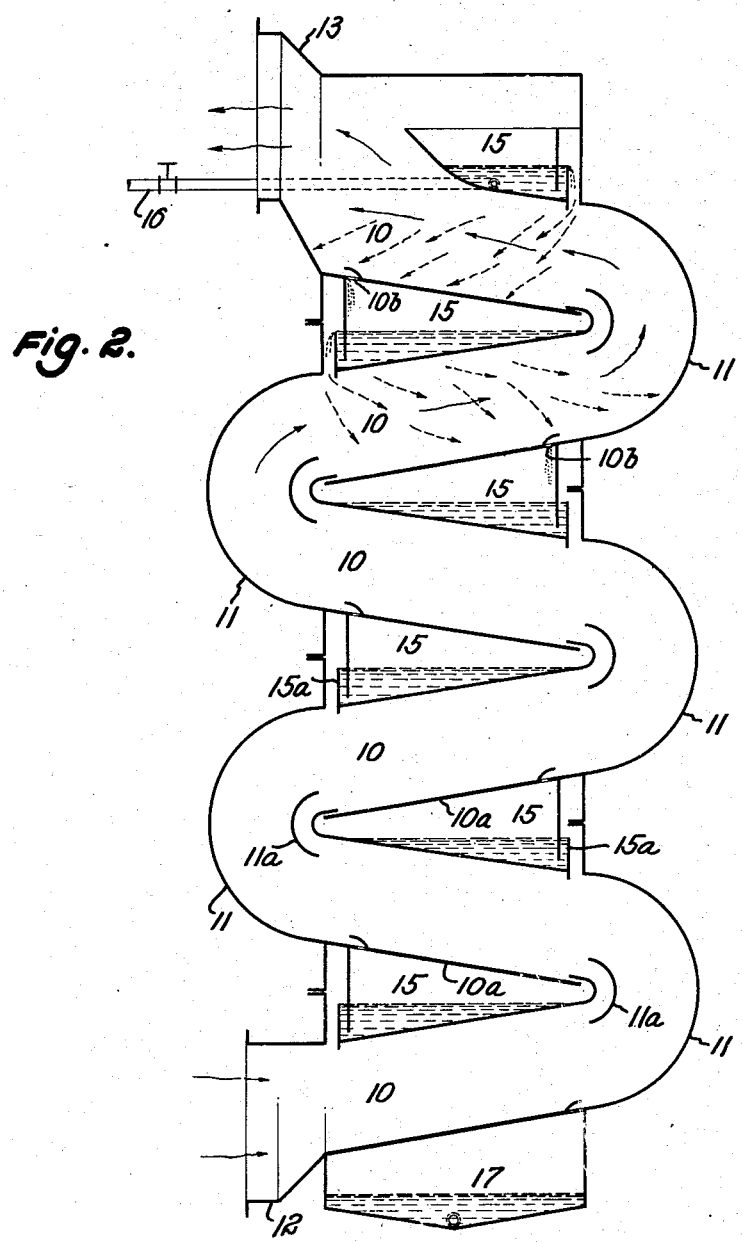

Patented Dec. 22, 1942

2,306,192

UNITED STATES PATENT OFFICE 2,306,192

COOLING TOWER

Joseph W. Spiselman, Brooklyn, N. Y., and Francis K. Green, Bound Brook, N. J., assignors to Research Corporation, New York, N. Y., a corporation of New York Application December 3, 1940, Serial No. 368,398

7 Claims. (Cl. 261—111)

This invention relates to a method and apparatus for the evaporative cooling of water and other liquids by contacting an extended surface stream of the liquid with a current of air or other gas having a substantial capacity for evaporating the liquid.

It has long been recognized that efficient cooling of water by a current of air requires that a large surface of the water be exposed to contact with the air and it has further been recognized that to approach closely the greatest degree of cooling, that is, to cool the water to a temperature approaching the wet bulb temperature of the available air, the flow of air and water should be counter-current so that water of lowest temperature is contacted with air of lowest wet bulb temperature.

While a large extent of contact surface may readily be provided by subdividing the water into droplets, as by spray devices, it has been found that the greater the extent of subdivision the more difficult it becomes to maintain counter-current flow of air and water, as the fine droplets of water are carried along with the air stream. In order to avoid this difficulty, evaporative cooling methods and devices have hitherto relied largely upon the use of extended solid surfaces such as perforated sheets and packing materials over which the water was caused to flow downward in contact with a generally upward current of air. These methods and devices have the serious drawback of introducing a substantial resistance to the flow of air, thereby entailing a loss of pressure and the necessity for blowers of increased cost and power consumption for maintaining the flow of air. Moreover, the substantial loss of head in passing through the apparatus very definitely limited the length of the path of contact as when a definite length of path is exceeded the air pressures at the air supply end of the apparatus become too large to be withstood by any economical construction. In addition the air velocities in apparatus of this character must be kept at a relatively low figure to prevent "channeling" and local or general blowing of the liquid off the surface of the packing material. This limitation very greatly reduces the space efficiency of the apparatus.

It has now been found that the efficiency and the close approach to theoretical cooling of counter-current evaporative contact can be obtained with a very low pressure drop of the gas stream and a very high space efficiency by subdividing an overall counter-current contact of the gas and liquid streams into a plurality of successive confluent contacts, for example, by establishing a generally upward stream of air in a plurality of successive paths having a substantial horizontal component and passing a stream of water downwardly and counter-current to said air stream but confluent therewith in each of said paths. This may be effected by supplying a stream of water into the air stream entering said paths at high velocity, for example, by feeding the water into the upper portion of the high velocity air stream.

A principal object of the invention is to provide an evaporative cooling method and apparatus whereby efficient evaporative cooling may be obtained with a very low pressure drop and a high space efficiency.

A further object of the invention is to provide apparatus wherein a stream of water may be passed generally counter-currently to a stream of air in a succession of confluent contact paths.

Further objects and advantages of the invention will appear from the following more particular description of the invention with reference to the accompanying drawings in which:

Fig. 1 is a diagrammatic sectional elevation illustrating one embodiment of the principles of the invention; and Fig. 2 is a diagrammatic sectional elevation illustrating a second embodiment of the principles of the invention.

The cooling tower diagrammatically illustrated in Fig. 1 comprises an air duct consisting of a plurality of superposed horizontal passages 10, arcuate passages 11 joining the horizontal passages, an inlet section 12 and an outlet section 13. The horizontal sections may advantageously be provided with low resistance vertical sheets 14 to improve the distribution of flow, particularly of the water, therein. Sheets of the readily wettable, porous material, having longitudinal spacing ribs 14a, available under the trade-name "Ace-Sil" are very suitable for this purpose.

The arcuate connecting passages 11 may be provided with flow distributing vanes 11a.

Above each of the horizontal air passages there is provided a chamber 15, forming a series of water reservoirs, the uppermost of which is supplied with a stream of water to be cooled by conduit 16 and the remainder receiving water passing through one or more openings in the bottoms 10a of the horizontal air passages 10. Below the lowermost horizontal passage is a collecting sump 17 for the cooled water. At the end of each of chambers 15 which is adjacent the air inlet end of the underlying horizontal air passage there is provided a flow control means such as a water seal or overflow weir 15a through which water flows into the upper portion of the air stream entering the subjacent air passage. The water seal is so constructed that an upward flow of air through this opening is prevented. The substantially horizontal air streams in passages 10 subdivide the water flowing over weirs 15a into droplets and carry the subdivided droplets along passages 10, thus providing a very extensive surface of contact and adequate time of contact for attaining fully the effective evaporative cooling available in each passage. The water surface is greatly increased where the water strikes and flows over the surfaces of sheets 14. The wetted surfaces not only present large areas for evaporation of the water into the passing air stream but tend to more or less retard the movement of the water and compel it to move slowly in the general direction of the air blowing over and in contact with it. Utilizing air streams at high velocity, applicants have found that the paths of the water along surfaces 14 have very substantial horizontal components, commonly in excess of 45 degrees, and the length of concurrent travel of water and air is greatly increased over that obtained when air at low velocity is blown over the water. A portion of the water drops through the air stream in the course of its flow through the horizontal passages 10 and flows through openings 10b and slot 18 into the subjacent reservoir 15. The remaining water droplets in the air stream are substantially completely removed by centrifugal force in arcuate passages 11 and the water thus collected flows back into the subjacent reservoir 15 through slot 18.

The cooling tower diagrammatically indicated in Fig. 2 involves similar principles of operation to those of the tower of Fig. 1, and equivalent structural elements are indicated with like numerals. Passages 10 of the apparatus of Fig. 2 are inclined but have a substantial horizontal component, and no flow-distributing members corresponding to sheets 14 of Fig. 1 are shown, although such members may be provided.

The method and apparatus of the invention make it possible to contact large volumes of air at high velocity with a given volume of water while retaining the efficiency and maximum temperature reduction of counter-current airwater contact. Air velocities as high as 2500 feet per minute may be used, particularly when vertical or horizontal flow distributing members are provided in the contact passages, and the air velocity may vary over a wide range, as the successive concurrent contacts maintain effective air-water contact over a wide range of velocities and the centrifugal force tending to eliminate water particles from the air stream in the arcuate passages increases with increasing air velocity and therefore tends to balance the increased carrying power at increased velocities. In general, however, air velocities of 900 to 2500 feet per minute, that is, from 3 to 8 times as great as the maximum permissible velocities in ordinary counter-current flow apparatus, are most effective in the method and apparatus of the invention, contacting, for example, from 100 to 200 cubic feet of air with each gallon of water supplied.

As an example of the effectiveness of the method and apparatus of the invention, water was supplied to a tower of the type illustrated in Fig. 1 and provided with 98.5 square feet of surface of "Ace-Sil" sheets per gallon per minute of water. Air having a wet bulb temperature of 66° F. was passed through the tower at a velocity of 1200 feet per minute in the open ends of passages 10, equivalent to 2500 feet per minute through the spaces between the vertical sheets of packing 14, in an amount equal to about 150 cubic feet per gallon of water. Under these conditions water supplied at 86° F. was cooled to 71° F., giving a 5° approach to the wet bulb temperature of the air with a 15° drop in temperature with a drop in air pressure of only 3 inches of water, while a 3° approach was obtainable when only a 10° drop in temperature of the water was required.

It will be apparent, particularly in view of the various forms of the invention already described, that the cooling towers embodying the principles of the invention may be given a wide variety of forms within the scope of the invention, it being only necessary that they provide a conduit for the generally upward flow of air through a plurality of superposed paths having a substantial horizontal component, and means for passing a stream of water generally downward through said conduit and confluent with the flow of air in each of said superposed paths.

We claim:

1. A method for the evaporative cooling of water which comprises establishing a generally upward stream of air through a plurality of successive unobstructed substantially horizontal paths of substantial length at a velocity of from about 900 to 2500 feet per minute and passing a stream of water generally downwardly and counter-current to said stream of air and in concurrent contact with said stream of air in each of said substantially horizontal paths, the water being introduced into the air stream in each of said substantially horizontal paths substantially only at the entrance end thereof.

2. A method for the evaporative cooling of water which comprises establishing a generally upward stream of air through a plurality of successive unobstructed substantially horizontal paths of substantial length at a velocity of from about 900 to 2500 feet per minute and passing a stream of water generally downwardly and counter-current to said stream of air and in concurrent contact with said stream of air in each of said substantially horizontal paths at a rate of from about 100 to about 200 cubic feet of air to each gallon of water, the water being introduced into the air stream in each of said substantially horizontal paths substantially only at the entrance end thereof.

3. Apparatus for the evaporative cooling of water comprising a conduit for the flow of air, said conduit comprising a plurality of superposed sections having a substantial horizontal component and a plurality of arcuate sections joining said superposed sections at alternate ends for the serial flow of air therethrough, air inlet means into the the lowermost of said superposed sections and air outlet means from the uppermost of said superposed sections, water collecting means positioned between adjacent superposed sections and shielding the water therein from contact with the air stream in said sections, means including a liquid seal for the flow of water from each of said water collecting means into the subjacent section at the upper part thereof substantially only adjacent the arcuate section supplying air thereto, and means for the flow of water from each of said superposed sections into the subjacent water collecting means.

4. Apparatus for the evaporative cooling of water comprising a conduit providing a path for the confined flow of air including a plurality of superposed sections having a substantial horizontal component, joined for the serial flow of air therethrough in alternate directions, means for supplying a stream of air at the lower end of said conduit, a reservoir for water interposed between adjacent superposed sections, means including a liquid seal for the supply of water from each of said reservoirs into the subjacent section substantially only at the point of entry of the air stream into said sections and means for the flow of water from each of said sections into the subjacent reservoir.

5. Apparatus for the evaporative cooling of water comprising a conduit providing a path for the confined flow of air including a plurality of superposed sections having a substantial horizontal component, joined for the serial flow of air therethrough in alternate directions, a plurality of parallel, longitudinally extending sheets positioned in spaced relation in each of said sections, means for supplying a stream of air at the lower end of said conduit, a reservoir for water interposed between adjacent superposed sections, means for the supply of water from each of said reservoirs into the subjacent section substantially only at the point of entry of the air stream into said sections and means for the flow of water from each of said sections into the subjacent reservoir.

6. Apparatus for the evaporative cooling of water comprising a conduit providing a path for the confined flow of air including a plurality of superposed sections having a substantial horizontal component, joined for the serial flow of air therethrough in alternate directions, a plurality of parallel, longitudinally extending, readily wettable, porous sheets positioned in spaced relation in each of said sections, means for supplying a stream of air at the lower end of said conduit, a reservoir for water interposed between adjacent superposed sections, means for the supply of water from each of said reservoirs into the subjacent section substantially only at the point of entry of the air stream into said sections and means for the flow of water from each of said sections into the subjacent reservoir.

7. Apparatus for the evaporative cooling of water comprising a conduit providing a path for the confined flow of air including a plurality of superposed sections having a substantial horizontal component, joined for the serial flow of air therethrough in alternate directions, a plurality of parallel, vertical, longitudinally extending sheets positioned in spaced relation in each of said sections, means for supplying a stream of air at the lower end of said conduit, a reservoir for water interposed between adjacent superposed sections, means for the supply of water from each of said reservoirs into the subjacent section substantially only at the point of entry of the air stream into said sections and means for the flow of water from each of said sections into the subjacent reservoir.

JOSEPH W. SPISELMAN.
FRANCIS K. GREEN.